United States Patent
Sonoda et al.

(10) Patent No.: US 9,472,988 B2
(45) Date of Patent: Oct. 18, 2016

(54) ROTARY ELECTRIC MACHINE AND METHOD OF MANUFACTURING THE SAME

(75) Inventors: Isao Sonoda, Chiyoda-ku (JP); Atsushi Sakaue, Chiyoda-ku (JP); Satoru Akutsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 522 days.

(21) Appl. No.: 14/110,747

(22) PCT Filed: Aug. 29, 2011

(86) PCT No.: PCT/JP2011/069422
§ 371 (c)(1),
(2), (4) Date: Oct. 9, 2013

(87) PCT Pub. No.: WO2013/030913
PCT Pub. Date: Mar. 7, 2013

(65) Prior Publication Data
US 2014/0028130 A1  Jan. 30, 2014

(51) Int. Cl.
H02K 3/26 (2006.01)
H02K 15/02 (2006.01)
H02K 3/28 (2006.01)
H02K 3/52 (2006.01)

(52) U.S. Cl.
CPC .............. *H02K 3/28* (2013.01); *H02K 3/522* (2013.01); *H02K 15/02* (2013.01); *H02K 2203/09* (2013.01); *Y10T 29/49009* (2015.01)

(58) Field of Classification Search
CPC ........ H02K 3/28; H02K 3/522; H02K 15/02; H02K 2203/09; Y10T 29/49009
USPC ....................................... 310/43, 71; 29/596
IPC ............................................. H02K 3/28, 15/02
See application file for complete search history.

(56) References Cited

U.S. PATENT DOCUMENTS

| | | | |
|---|---|---|---|
| 6,914,356 B2 * | 7/2005 | Yamamura | H02K 3/50 310/71 |
| 6,924,570 B2 * | 8/2005 | De Filippis | H02K 3/522 310/260 |

(Continued)

FOREIGN PATENT DOCUMENTS

| | | |
|---|---|---|
| JP | 6-113499 A | 4/1994 |
| JP | 2001-275327 A | 10/2001 |

(Continued)

OTHER PUBLICATIONS

International Search Report for PCT/JP2011/069422 dated Oct. 11, 2011.

(Continued)

*Primary Examiner* — John K Kim
(74) *Attorney, Agent, or Firm* — Sughrue Mion, PLLC; Richard C. Turner

(57) ABSTRACT

A rotary electric machine according to the present invention includes a stator having a connection member forming a three phase delta connection by coil windings, including an insulating annular groove portion formed with double annular grooves and a first, a second, and a third annular conductive members, the annular conductive members being attached by insertion into the insulating annular groove portion; the insulating annular groove portion is formed with double grooves of one and the other, and both the grooves are connected via one window portion; the respective annular conductive members are each formed in a circular arc shape and provided with a plurality of arm portions extended outward in the radial direction of the stator, the plurality of arm portions being connected to coil end portions of the coil windings respectively.

6 Claims, 12 Drawing Sheets

(56) References Cited

U.S. PATENT DOCUMENTS

| | | | | |
|---|---|---|---|---|
| 7,247,962 | B2* | 7/2007 | Burgbacher | H02K 3/522 310/184 |
| 7,723,878 | B2* | 5/2010 | Yagai | H02K 3/522 310/71 |
| 8,018,104 | B2* | 9/2011 | Yagai | H02K 3/522 310/71 |
| 2002/0047365 | A1 | 4/2002 | Yagyu et al. | |
| 2003/0201688 | A1 | 10/2003 | Yamamura et al. | |
| 2007/0205678 | A1 | 9/2007 | Takashima et al. | |
| 2010/0187924 | A1* | 7/2010 | Yagai | H02K 3/522 310/71 |
| 2014/0028130 | A1* | 1/2014 | Sonoda | H02K 3/28 310/71 |

FOREIGN PATENT DOCUMENTS

| | | |
|---|---|---|
| JP | 2002-78272 A | 3/2002 |
| JP | 3613262 B2 | 1/2005 |
| JP | 2007-244008 A | 9/2007 |

OTHER PUBLICATIONS

Communication dated Jan. 6, 2015 from the Japanese Patent Office in counterpart application No. 2013-530897.

Communication dated Feb. 5, 2016, issued by the European Patent Office in corresponding European Application No. 11871749.5.

Japanese Office Action (Reason) issued May 20, 2104, in Patent Application No. 2013-530897.

\* cited by examiner

ROTARY ELECTRIC MACHINE AND METHOD OF MANUFACTURING THE SAME

This application is a National Stage of International Application No.PCT/2011/069422 filed Aug. 29, 2011, the contents of which are incorporated herein by reference in their entirety.

TECHNICAL FIELD

The present invention particularly relates to a connection structure of a plurality of coils of three phase delta connection in a rotary electric machine and a method of manufacturing the same.

BACKGROUND ART

Conventionally, a rotary electric machine is composed of a stator and a rotor; and a plurality of coils are wound around a tooth of the stator core. In an electric motor (motor), the rotor rotates by a magnetic field generated by flowing a current to the coils.

On the other hand, a generator generates electric power by flowing a current to the coils of the stator by rotating the rotor. The current is made to flow or the current flows to the wound coils; and accordingly, the plurality of coils have to be connected in series or in parallel, connection processing of coil terminals is complicate and requires a space in view of manufacturing the rotary electric machine as the number of coil wires increases.

PRIOR ART DOCUMENT

Patent Document

Patent Document 1: Japanese Examined Patent Publication No. 3613262

SUMMARY OF THE INVENTION

Problems to be Solved by the Invention

A coil connection structure in the aforementioned conventional rotary electric machine has a plurality of arm portions integrated with annular belt shape conductive members, the conductive members are concentrically arranged in plurality, the annular conductive members are held on the coil windings of the stator core by an insulating holder, and wound coil ends are extended to be connected to the arm portions.

The connection processing of the coil ends is simplified by this structure and arrangement can be made compact on the upper side of the stator core; however, the belt shape conductive members need a large number of annular members.

The aforementioned coil connection structure of the rotary electric machine, for example, in a type having 12 slot and 24 coil terminals as shown in FIG. 3 to FIG. 5 of the patent document, needs four concentric circle shaped conductive members and there is a room for an improvement in view of workability and in view of space.

That is, the rotary electric machine of three phase windings has triple or more annular conductive members and the connection processing of the coil ends is performed.

The present invention has been made to solve the foregoing problem, and an object of the present invention is to provide a rotary electric machine and a method of manufacturing the same, which are space saving and can further improve workability.

Means for Solving the Problems

According to the present invention, there is provided a rotary electric machine including a stator having teeth to which a plurality of coil windings are attached by winding and a connection member forming a three phase delta connection by the coil windings, wherein the connection member is arranged on the coil end portion side of the coil windings of the stator, and is composed of an insulating annular groove portion formed with double annular grooves, a first annular conductive member, a second annular conductive member, and a third annular conductive member, the annular conductive members being attached by insertion into the insulating annular groove portion;

the insulating annular groove portion is formed with double grooves of one and the other, and both the grooves are connected via one window portion;

the respective annular conductive members are each formed in a circular arc shape and provided with a plurality of arm portions extended outward in the radial direction of the stator, the plurality of arm portions being connected to the coil end portions of the coil windings respectively;

the first annular conductive member and the second annular conductive member are attached by insertion into different grooves of the insulating annular groove portion, are overlapped at a part of opened sections where a circular arc is not present, are in a positional relationship in which both the annular conductive members are opened, and are attached by insertion so that the window portion is disposed at the position where both the annular conductive members are opened; and the third annular conductive member is made such that a portion to be attached by insertion into one groove and a portion to be attached by insertion into the other groove are attached by insertion into the insulating annular groove portion via the window portion.

Furthermore, according to the present invention, there is provided a method of manufacturing a rotary electric machine including a stator having teeth to which a plurality of coil windings are attached by winding and a connection member forming a three phase delta connection by the coil windings, wherein the method including a step of manufacturing the connection member, the manufacturing step of the connection member including: a step of manufacturing an insulating annular groove portion in which double grooves of one and the other are formed and both the grooves are connected via one window portion; a step of manufacturing a first annular conductive member, a second annular conductive member, and a third annular conductive member; and an assembling step of assembling the respective annular conductive members on the insulating annular groove portion, the manufacturing step of the respective annular conductive members including a step of manufacturing the first annular conductive member, the second annular conductive member, and the third annular conductive member having a crossover portion that connects one groove and the other groove at the center of the window portion, each of the annular conductive members being provided with a plurality of arm portions extended in the radial direction of the stator and being formed in a circular arc shape, and the assembly step including: a step of attaching the first annular conductive member by inserting into the one groove so that the window portion is located in an opened section where a circular arc is not present; a step of attaching by insertion into the groove so that the crossover portion of the third annular conductive member is located in the window portion; and a step of attaching the second annular conductive member by inserting into the other groove so that the window portion is located in an opened section where a circular arc is not present, and wherein the method including:

a step of fixing the connection member assembled with the respective members to the stator; and a step of connecting the arm portions and coil end portions of the coil windings.

Advantageous Effect of the Invention

According to a rotary electric machine and a method of manufacturing the same of the present invention, the connection member forming a three phase delta connection by the coil windings is arranged on the coil end portion side of the coil winding of the stator, and is composed of the insulating annular groove portion formed with double annular grooves, the first annular conductive member, the second annular conductive member, and the third annular conductive member, the annular conductive members being attached by insertion into the insulating annular groove portion, whereby there can be obtained the rotary electric machine and the method of manufacturing the same, in which coil terminal processing can be easily achieved, workability is improved, and space saving can be secured.

MODE FOR CARRYING OUT THE INVENTION

Embodiment 1

Figure 1:
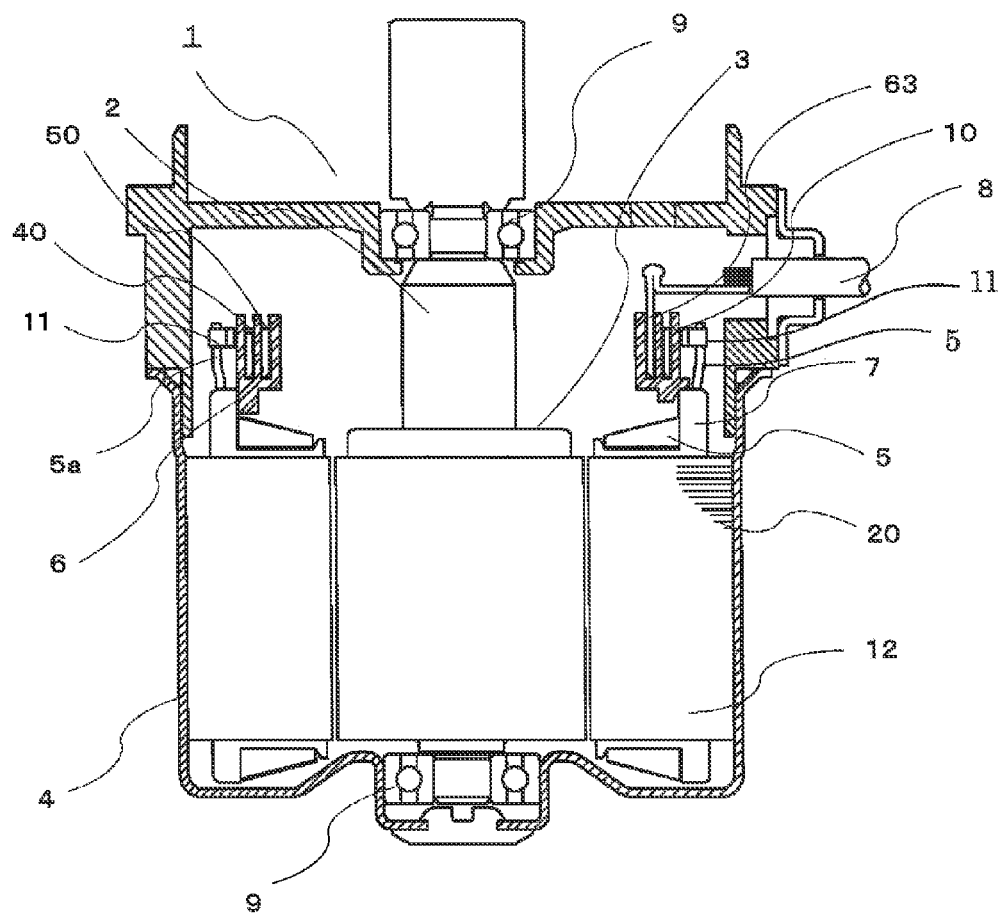
FIG. 1 is a sectional view showing a rotary electric machine according to Embodiment 1 of the present invention.
Figure 2A:
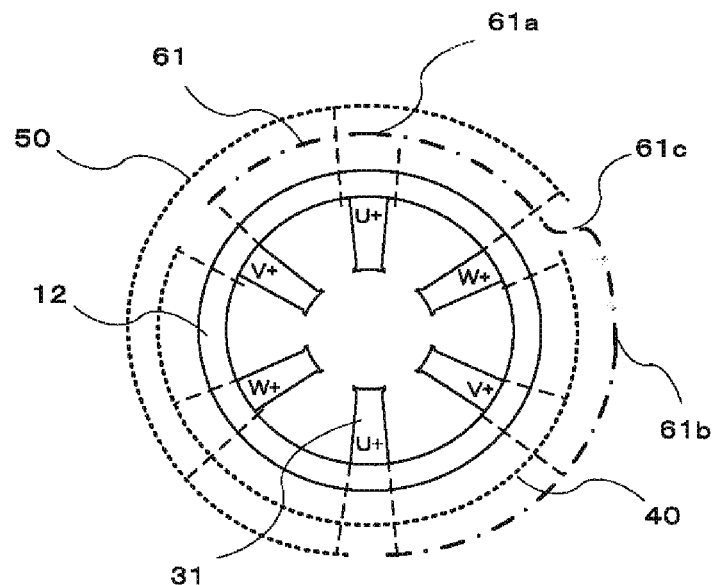
FIG. 2A and FIG. 2B are conceptual views showing windings and annular conductive members of a 4 pole and 6 slot type in the rotary electric machine according to Embodiment 1 of the present invention.
Figure 2B:
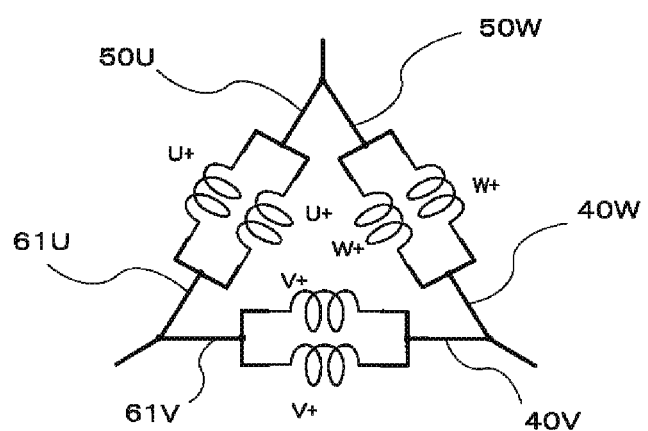
Figure 3A:
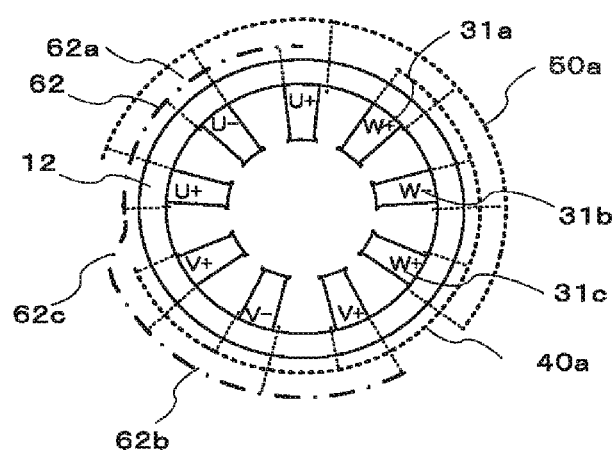
FIG. 3A and FIG. 3B are conceptual views showing windings and annular conductive members of a 8 pole and 9 slot type in the rotary electric machine according to Embodiment 1 of the present invention.
Figure 3B:
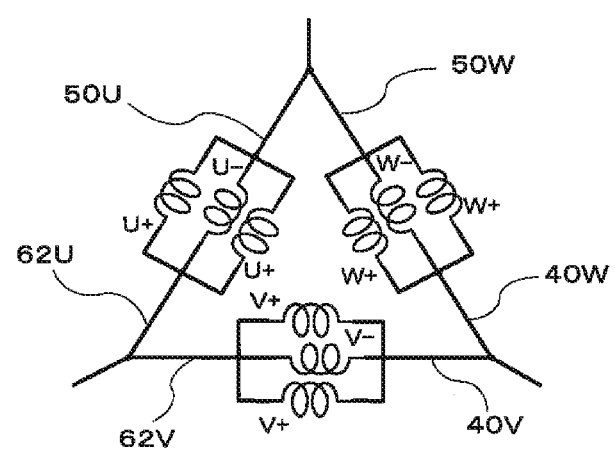
Figure 4A:
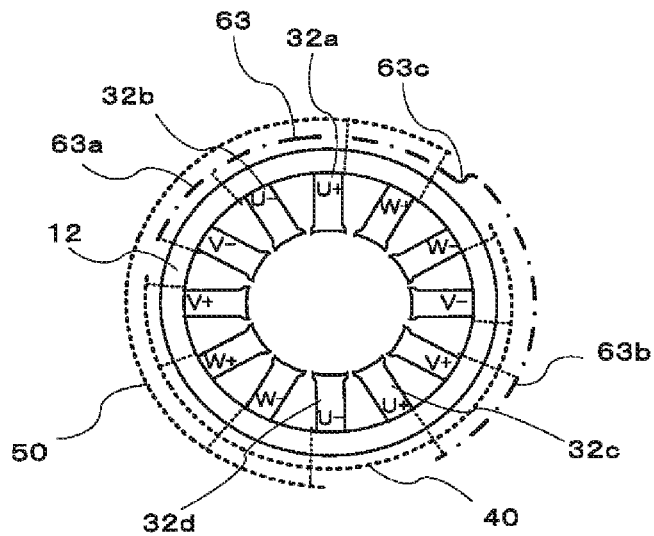
FIG. 4A and FIG. 4B are conceptual views showing windings and annular conductive members of a 10 pole and 12 slot type in the rotary electric machine according to Embodiment 1 of the present invention.
Figure 4B:
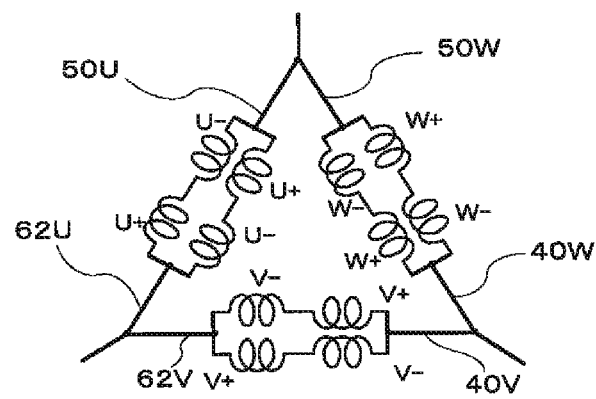
Figure 5A:
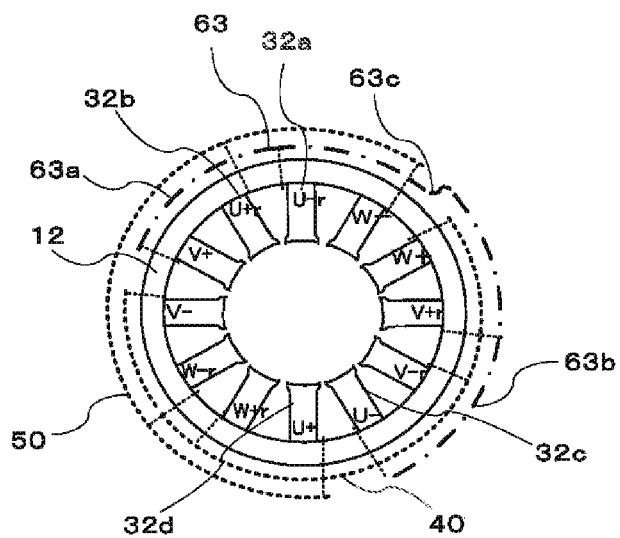
FIG. 5A and FIG. 5B are conceptual views showing other example of windings and annular conductive members of a 10 pole and 12 slot type in the rotary electric machine according to Embodiment 1 of the present invention.
Figure 5B:
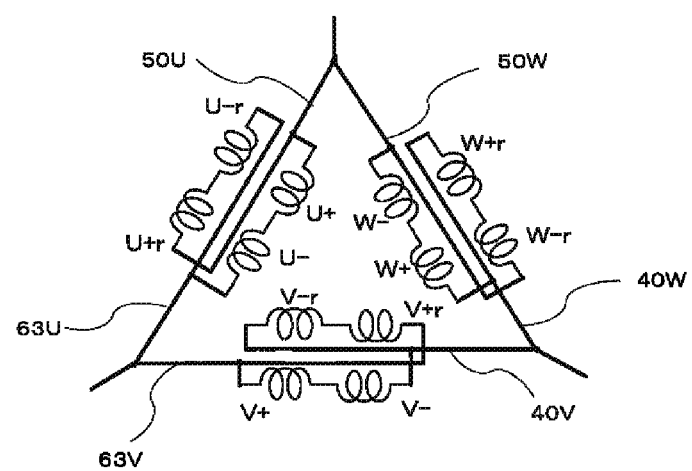

Hereinafter, Embodiment 1 of the present invention will be described with reference to FIG. 1 to FIG. 4A and FIG. 4B. In the respective drawings, identical or equivalent members and portions will be described with the same reference numerals assigned thereto. FIG. 1 is a sectional view showing a rotary electric machine according to Embodiment 1 of the present invention. FIG. 2A and FIG. 2B are conceptual views showing windings and annular conductive members of a 4 pole and 6 slot type in the rotary electric machine according to Embodiment 1 of the present invention. FIG. 3A and FIG. 3B are conceptual views showing windings and annular conductive members of a 8 pole and 9 slot type in the rotary electric machine according to Embodiment 1 of the present invention. FIG. 4A and FIG. 4B are conceptual views showing windings and annular conductive members of a 10 pole and 12 slot type in the rotary electric machine according to Embodiment 1 of the present invention. FIG. 5A and FIG. 5B are conceptual views showing windings and annular conductive members of a 10 pole and 12 slot type in the rotary electric machine according to Embodiment 1 of the present invention.

FIG. 1 shows the entire configuration of a rotary electric machine (motor) 1; and a rotor 2 and a stator 20 are incorporated in a frame 4. The rotor 2 is provided with a plurality of permanent magnets 3 (details are not shown in the drawing) which are regularly arranged and is rotatably supported by two bearings 9.

On the other hand, the stator 20 is composed of: a stator core 12 laminated with a large number of magnetic steel sheets; bobbins for coil windings 7, the bobbin being molded with insulating resin; and coil windings 5 wound around the bobbins 7 by a predetermined winding method.

Further, a connection member 10 is arranged in the motor axial direction (upper direction in FIG. 1) of the stator core 12; the connection member 10 is arranged with an insulating annular groove portion 6 molded with insulation material by being fixed to the bobbins 7; and a first annular conductive member 40, a second annular conductive member 50, and a third annular conductive member 61 are attached by insertion into the insulating annular groove portion 6 (two grooves in FIG. 1).

Furthermore, one side of coil end portions 5a of the coil winding 5 is extended from the bobbin 7 and is connected to an arm portion 11 extended from each of the annular conductive members 40, 50, and 61. Further, a connection is made to a lead wire 8 from a part of the respective annular conductive members 40, 50, and 61. A current is supplied from the lead wire 8 to the coil winding 5 through a switching element (not shown in the drawing) to generate a magnetic field to rotate the rotor 2. The rotary electric machine (motor) 1 of FIG. 1 shows a brush-less motor structure. Incidentally, the annular conductive members 40, 50, and 61 are each made of a material equivalent to the coil winding 5, for example, copper-made.

In the aforementioned brush-less motor, various specific types of connections of the coil windings 5 and the coil end portions 5a will be described using FIG. 2A and FIG. 2B to FIG. 5A and FIG. 5B. In each of the drawings, a three-phase delta connection is made; (a) shows a conceptual view of the respective annular conductive members; and (b) shows an electrical circuit of (a). Three phases are referred to as U phase, V phase, and W phase, respectively; and the respective coils are also similarly referred to as U phase, V phase, and W phase. In the drawings, identical or equivalent members will be described with the same reference numerals assigned thereto.

FIG. 2A and FIG. 2B conceptually show the coil windings and the respective annular conductive members 40, 50, and 61 of, for example, a motor of 4 poles and 6 slots (hereinafter, referred to as 4P6S). As shown in FIG. 2B, the coil windings are connected in delta connection by 6 coils. Reference numeral 12 denotes the stator core; and 31 denotes a tooth extended from the stator core 12 toward the center. Respective phase coils are wound around the tooth 31; however, the coil windings are omitted in the drawing.

Furthermore, a beginning end and a termination end of the coil winding are extended to each tooth 31; and both the ends are connected in accordance with a circuit diagram of FIG. 2B to the arm portion (not shown in the drawing, 11 of FIG. 1) extended from each annular conductive member 40, 50, and 61, which is circular arc-shaped and is opened at one portion.

Figure 10A:
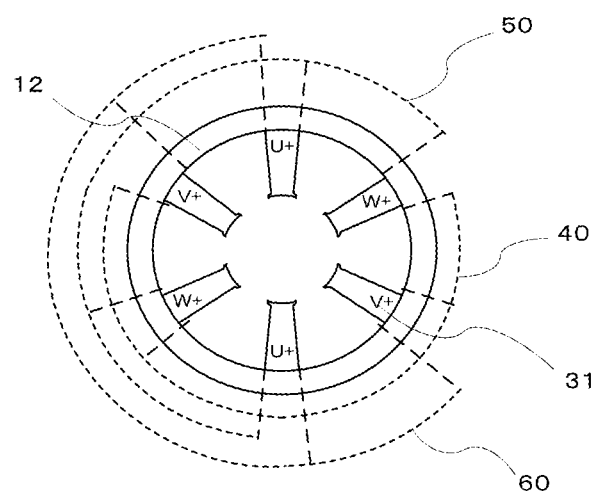
FIG. 10A and FIG. 10B are conceptual views showing windings and annular conductive members of a 4 pole and 6 slot type in a conventional rotary electric machine.
Figure 10B:
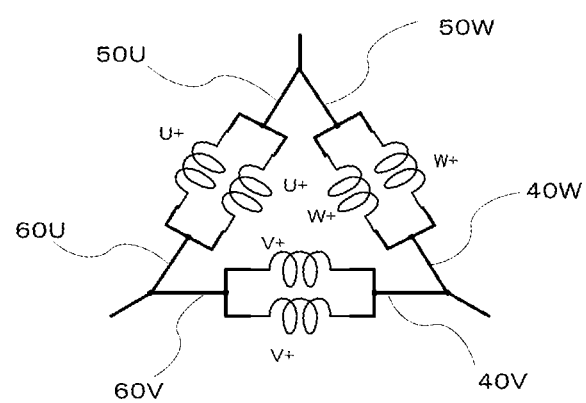

The coil windings include 6 coils in which 2 coils are connected in parallel per phase. In the conventional connection method, connection is generally made by using annular conductive members 40, 50, and 60 for each phase and the annular conductive members are formed in a triple annular shape as shown in FIG. 10A. This shows that a coil 40V and a coil 40W are connected to a first annular conductive member 40; similarly, a coil 50W and a coil 50U are connected to a second annular conductive member 50; and a coil 60U and a coil 60V are connected to a third annular conductive member 60, respectively. Then, it shows that "+" and "−" are opposite in winding direction. For example, it shows that "+" is wound clockwise toward the center of a circle and "−" is wound counterclockwise. Even if the phase is different, the winding direction shows the same if symbols of "+" and "−" are the same.

On the other hand, Embodiment 1 of the present invention is not configured by triple annular conductive members, but by double annular conductive members as shown in FIG. 2A. The first annular conductive member 40 and the second annular conductive member 50 are the same as FIG. 10(a); and the third annular conductive member 60 is changed to the third annular conductive member 61 which is composed a conductive member 61a, a conductive member 61b, and a crossover portion 61c.

That is, the conductive member of 61a is located on the same circumference as the first annular conductive member 40 on the innermost circumference; and the conductive member of 61b is arranged on a second annular position on the outer circumferential side than the first annular conductive member 40. One coil end portion of the coil 60U and the coil 60V is connected to 61a, and the remaining other coil end portion is connected to 61b.

Further, 61c is a crossover portion that transitions from the innermost circumference to the second annular position; and this position is a phase coil position which is not connected (a position where a W phase coil is wound in FIG. 2A and FIG. 2B), and utilizes the position of a section where both the first annular conductive member 40 and the second annular conductive member 50 are partially opened.

The positions of the first annular conductive member 40 on the innermost circumference and the second annular conductive member 50 on the second circumference are arranged in this manner and the crossover portion 61c is arranged at the position of the tooth 31 which is not required for connection; and consequently, the first annular conductive member 40 on the innermost circumference and the second annular conductive member 50 on the second circumference can be connected. As a result, the aforementioned conventional triple annular structure can be reduced to a double annular structure as in Embodiment 1 of the present invention.

Figure 11A:
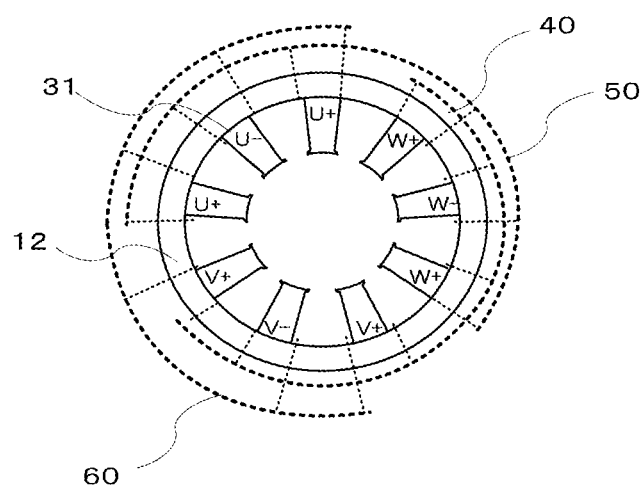
FIG. 11A and FIG. 11B are conceptual views showing windings and annular conductive members of a 8 pole and 9 slot type in the conventional rotary electric machine.
Figure 11B:
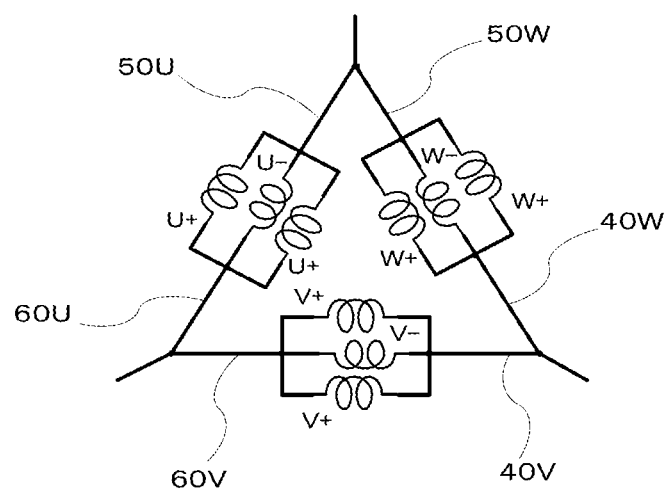

Next, FIG. 3A and FIG. 3B show a 8 pole and 9 sleeve (hereinafter, referred to 8P9S) type. Coil windings include 9 coils in which 3 coils are connected in parallel, which is a drawing configuration similar to FIG. 2A and FIG. 2B and reference numerals are similarly assigned. The coil windings 5 include 9 coils in which 3 coils are connected in parallel per phase. In a conventional connection method, connection is generally made by using annular conductive members 40, 50, and 60 for each phase and the annular conductive members are formed in a triple annular shape as shown in FIG. 11A. This shows that a coil 40V and a coil 40W are connected to the first annular conductive member 40; similarly, a coil 50W and a coil 50U are connected to the second annular conductive member 50; and a coil 60O and a coil 60V are connected to the third annular conductive member 60, respectively. Then, it shows that "+" and "−" are opposite in winding direction. For example, it shows that "+" is wound clockwise toward the center of a circle and "−" is wound counterclockwise. Even if the phase is different, the winding direction shows the same if symbols of "+" and "−" are the same.

Furthermore, also in the connection method of FIG. 3A, first, a tooth 31a and a tooth 31c are for "+" windings and a tooth 31b arranged therebetween is for "−" winding. Therefore, the teeth of the same phase are adjacent and the coil windings are wound clockwise in the tooth 31a and the tooth 31c, and the coil winding is wound counterclockwise in the tooth 31b. In this manner, the coil windings are wound and respective end portions are connected in accordance with a circuit diagram of FIG. 3B. In this case, a first annular conductive member 40a and a second annular conductive member 50a are equivalent to conventional FIG. 11A. However, a third annular conductive member 62 is composed of a conductive member 62a, a conductive member 62b, and a crossover portion 62c.

That is, the conductive member of 62a is located on the same circumference as the first annular conductive member 40 on the innermost circumference and is connected to the coil 60U; the conductive member of 62b is arranged at a second annular position on the outer circumferential side than the first annular conductive member 40 and is connected to the coil 60V; and both the conductive members are connected to the same number of coil windings.

Furthermore, the crossover portion 62c that connects the conductive member 62a to the conductive member 62b crosses over from the innermost circumference to the second annular groove. The crossover portion 62c can be arranged by being located at a position where the first annular conductive member 90 and the second annular conductive member 50 are partially opened and by utilizing the space between the teeth. In this manner, the aforementioned conventional triple annular structure can be reduced to a double annular structure.

Figure 12A:
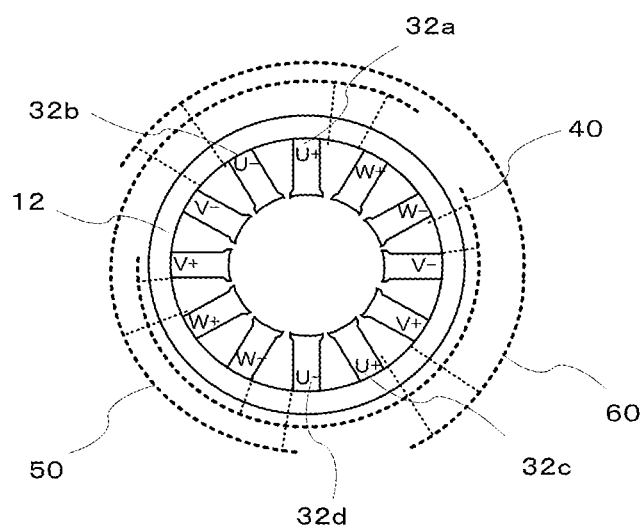
FIG. 12A and FIG. 12B are conceptual views showing other example of windings and annular conductive members of a 10 pole and 12 slot type in the rotary electric machine.
Figure 12B:
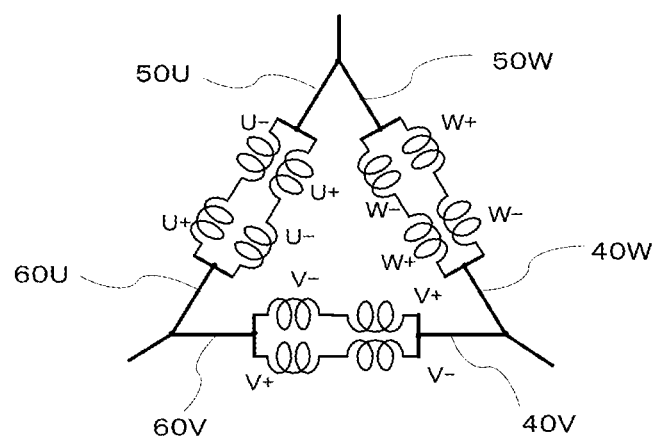

Next, a type in which 12 coils of 10 poles and 12 sleeves (hereinafter, referred to as 1012S) are used in FIG. 4A and FIG. 4B and FIG. 5A and FIG. 5B will be described. Coil connection processing is similarly performed in a motor in which the coil windings of one phase are configured by 2 parallel groups of 2 coils in series and these are connected in delta as shown in a circuit diagram of FIG. 4B. For example, conventionally, respective phases are formed in a triple annular shape having annular conductive members 40, 50, and 60 as shown in FIG. 12A. In this case, for example, a series coil wire of U+ and U− is wound around adjacent teeth 32a and 32b and a series coil wire of the remaining U+ and U− is wound around teeth 32c and 32d opposite to the teeth 32b and 32a. Furthermore, U+ and U− are a continuous wire because of the series coil wire and are wound clockwise around the tooth 32a. Subsequently, the coil wire is extended to the tooth 32b and is further wound counterclockwise.

In the present invention of FIG. 4A, a first annular conductive member 40 and a second annular conductive member 50 which are the same as the conventional ones are arranged at the same position. On the other hand, coil connection of the remaining coil 60U and coil 60V is designed to be connected to a conductive member 63a and a conductive member 63b of a third annular conductive member 63, respectively; and the conductive member 63a and the conductive member 63b are located in a different annular arrangement and these conductive members are connected by a crossover portion 63c.

That is, arrangement is made such that one is located on the innermost circumference and the other is located at the second annular position; and the crossover portion 63c is arranged at a section where the first annular conductive member 40 and the second annular conductive member 50 are partially opened and at the space between extended wires of coil windings; and therefore the configuration can be made in a double annular shape.

Furthermore, arm portions of the respective annular conductive members 40, 50, and 63 are the same number (four) for each conductive member. As for the third annular conductive member 63, a half (2) of the arm portions is arranged on the innermost circumference and the remaining is arranged at a position corresponding to a second groove. In this manner, the aforementioned conventional triple annular structure can be reduced to a double annular structure.

FIG. 5A and FIG. 5B are the modification of FIG. 4A and FIG. 4B. As shown in FIG. 5A, a connection method of coil windings is changed; and further, as for windings designated with a letter "r," the winding directions of "+" and "−" are reversed. By adopting such windings, the winding directions in FIG. 5B show counterclockwise and clockwise in turn in such a manner that "U+r" is counterclockwise, "U−r" is clockwise, "W−" is counterclockwise, and "W+" is clockwise. When coil winding is performed, winding can be performed according to this regularity; and therefore, effects exist that the configuration of a winding machine is simple, a plurality of the same winding machines can be wound at the same time in the same direction, and winding time can be reduced.

Incidentally, 14P12S can also be configured as is the case with FIG. 4A. Furthermore, motors having a further large number of coil windings, such as 12P18S, 16P18S, 16P24S, and 20P24S are conceivable; however, the double annular shape is difficult. On the other hand, if in the case of one group of three phase windings such as 2P3S and 4P3S, a configuration can be achieved by a single annular shape; and therefore, such a configuration is not linked to the present invention.

In the aforementioned description, three annular conductive members are used, each annular conductive member has the same number of arm portions, and the third annular conductive member is provided with the crossover portion that crosses the grooves; and consequently, the triple annular shape in the radial direction of the stator can be changed to the double annular shape, the connection member itself on the stator core is compact, and arrangement can be made within the radial width of the stator core.

Next, further detail of the coil connection of the double annular shape shown in Embodiment 1 and a manufacturing method will also be described. The description will be made on the coil winding (10P12S) of FIG. 4A and FIG. 4B as an example. A connection member 10 made of a different member is arranged on the bobbin 7 shown in FIG. 1.

As the manufacturing method, first, the stator 20 wound with coils is manufactured. As for this process, for example, there is a method in which the laminated belt shape stator core 12 1 is manufactured, the bobbin 7 is fitted, a coil wire is wound around the bobbin, and then the entire stator 20 is formed in the annular shape. Furthermore, the coil end portions are made to extend outward in the radial direction from the axial direction of the stator core 12.

On the other hand, as for the connection member 10, the insulating annular groove portion 6 is manufactured by insulation resin, the first annular conductive member 40 and the second annular conductive member 50 are manufactured, and similarly, the third annular conductive member 63 in which the conductive member 63a and the conductive member 63b are integrated by the crossover portion 63c is manufactured.

Incidentally, the respective annular conductive members 40, 50, and 63 are integrally manufactured with the arm portions 11 which are for connecting the coil end portions 5a of the coil windings 5. Next, the second annular conductive member 50 is inserted into the groove on the radially outer side of the insulating annular groove portion 6; subsequently, the third annular conductive member 63 having the crossover portion 63c is inserted; and finally, the first annular conductive member 40 on the innermost circumference side is inserted. Next, the entire connection member 10 having the insulating annular groove portion 6 in which the respective annular conductive members 40, 50, and 63 are inserted is attached to the bobbins 7. Finally, the coil end portions 5a of the coil windings 5 are connected to the arm portions 11. The stator 20 is completed in this state; and therefore, insertion of the stator 20 into the frame 4, connection to the lead wire 8, and insertion of the rotor 2 are performed.

Figure 6:
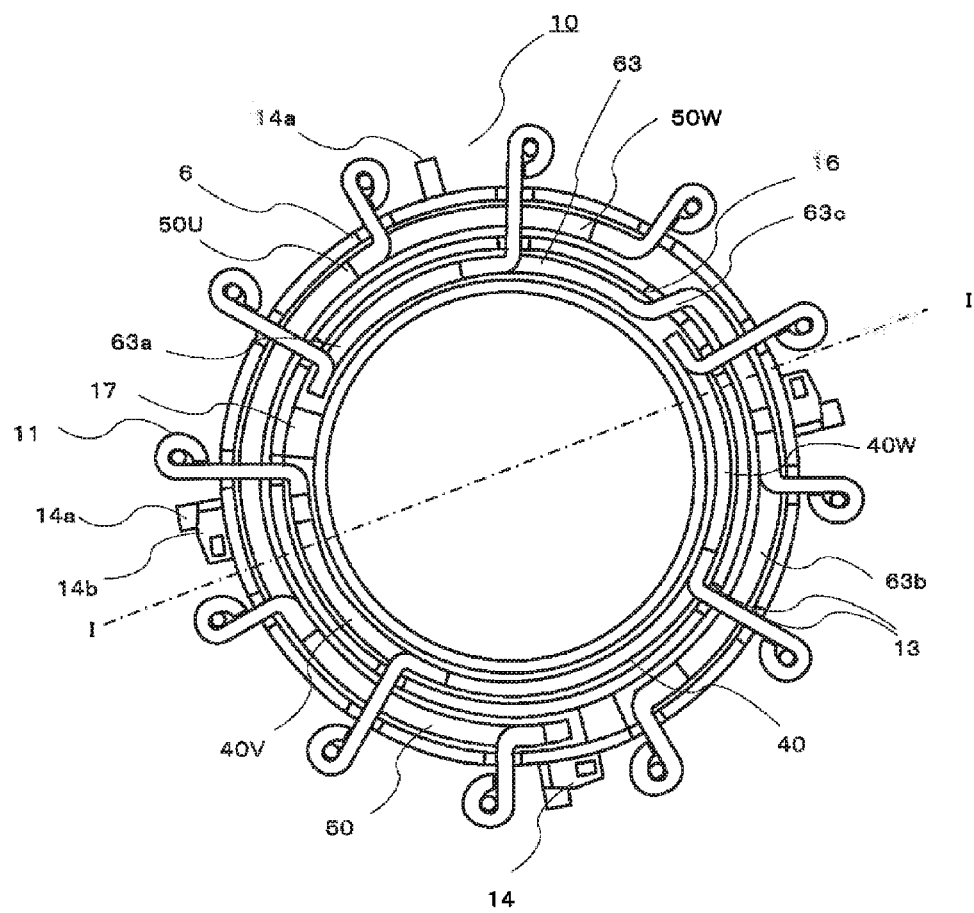
FIG. 6 is a plan view showing a connection member of a 10 pole and 12 slot type in the rotary electric machine according to Embodiment 1 of the present invention.
Figure 7:
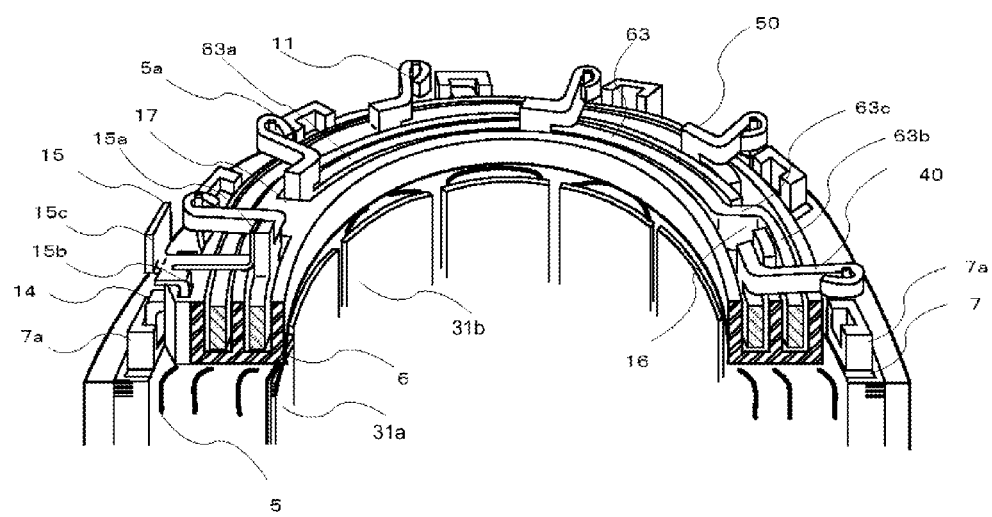
FIG. 7 is a relevant part perspective view taken along the line I-I of FIG. 6 showing the rotary electric machine according to Embodiment 1 of the present invention.

Now, the insulating annular groove portion 6 and the respective annular conductive members 40, 50, and 63, which constitute the connection member 10 will be further described by using FIGS. 6 and 7. In the insulating annular groove portion 6, "6*2+6=18" cutout portions 13 are cut out at positions where the arm portions 11 which are for connecting to the coil end portions 5a of the coil windings 5 are extended. The arm portions 11 of the respective annular conductive members 40, 50, and 63 are extended radially outward on these cutout portions 13.

Furthermore, the window portion 16 is provided and a groove frame is cut so that the crossover portion 63c can be arranged in the window portion 16. In addition, a plurality of holding portions 14 are arranged on the outermost circumference so as to be capable of being supported by the bobbins 7. Further, these holding portions 14 have two types of shapes; reference numeral 14a is a leg portion that is merely supported by the bobbins 7; and the holding portion 14 has a base 14b and the leg portion 14a so that a terminal can be placed. As described above, insertion is made into the thus formed insulating annular groove portion 6 in the order corresponding to the respective annular conductive members 50, 63, and 40.

FIG. 7 is a relevant part perspective view in which a cross section taken along the line I-I of FIG. 6 and a part of the annular shape are viewed in a perspective manner. Twelve laminated portion forming a stator core 12 is arranged in the annular shape and the bobbin 7 is provided on each of tooth (e.g., 31a,31b)of the stator core 12. The bobbin 7 is not only wound by the coil winding 5 but also has a projection 7a having a concave portion. The projection 7a can be used for positioning of the coil end portion 5a of the coil winding 5. Furthermore, the leg portion 14a of the holding portion 14 radially extended outward from the insulating annular groove portion 6 can be inserted into the concave portion and the bobbins 7 support the insulating annular groove portion 6 by both concave and convex structures.

A terminal 15 is a member that connects mainly the coil winding 5 and the lead wire 8 of FIG. 1 and the terminal 15 has three end portions 15a, 15b, and 15c. The end portion of 15a is extended to the positions of the respective annular conductive members 40, 50, and 63 so as to be capable of being connected (for example, welding) to the coil winding 5. Furthermore, the end portion 15b is bent to be inserted into a hole formed in the base 14b of the holding portion 14. This serves to fix the terminal itself. An end part of the end portion 15c is a section which is for being connected to the lead wire 8. The terminal can be configured by such a component different from the annular conductive member; however, as shown in FIG. 1, the annular conductive member may be directly extended to be an integrated terminal as is the case with the arm portion.

The respective annular conductive members 40, 50, and 63 form three types of shapes and have the arm portions 11 which are for connecting to the end portions 5a of the coil windings 5. The arm portions 11 are extended in parallel to annular portions of the respective annular conductive members and can be integrally formed. Furthermore, it also becomes possible to perform fusing welding for connection to the coil end portion 5a of the coil winding 5 by shaping so that the end portion of the arm portion 11 is wound around the coil.

Furthermore, the other end of the arm portion 11 has a surface so as to be able to weld to the end portion 15a of the terminal 15. In this case, the plate thickness direction of the conductive member is put vertically in the drawing and the conductive member is inserted into the groove; and consequently, radial width is suppressed, it makes easy to form the annual shape, the surface (belt) is extended in the axial direction, and area capable of being welded to the coil end and the terminal is secured.

The insulating annular groove portion 6 is an E shape having double grooves and triple walls which are for respectively separating these grooves, and this serves to come into contact with the respective annular conductive members and to fix the conductive members. Furthermore, positioning of the third annular conductive member 63 having the crossover portion 63c becomes easy by the window portion 16 between the grooves, the window portion being provided at one portion in the insulating annular groove portion 6.

Moreover, the position of the window portion 16 is located between other two annular conductive members and between the coil end portions 5a of the coil windings 5, and the annular position is effectively utilized. Incidentally, as compared to the cutout portion 13, cutout depth is different and the window portion 16 is cut out to the bottom of the groove.

Besides, a partition 17 is provided so that positioning of the first annular conductive member 40 and the second annular conductive member 50 can be performed. Therefore, when the first annular conductive member 40 and the second annular conductive member 50 are inserted into the grooves, the insertion is made by bringing end portions of the annular conductive members into contact with the partition 17 and thus the positioning is easy.

The respective annular conductive members 40, 50, and 63 are inserted into the thus formed insulating annular groove portion 6 and the terminals 15 are further attached at predetermined three positions to be able to put in a manufacturing process as integrated sub-assembly. In this way, stator assembly wound by coil and the sub-assembly are separately manufactured and the assembly and the sub-assembly are integrated by inserting the sub-assembly from the axially upper portion of the stator assembly; and therefore, assembly can be simplified.

Embodiment 2

Figure 8A:
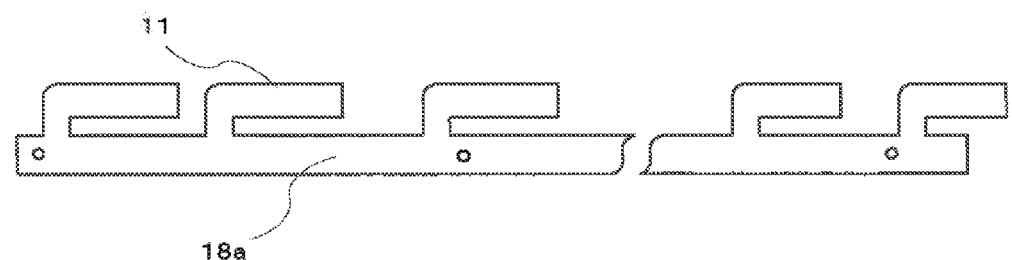
FIG. 8A is a front view and FIG. 8B is a plan view, each showing an annular conductive member in a rotary electric machine according to Embodiment 2 of the present invention.
Figure 8B:
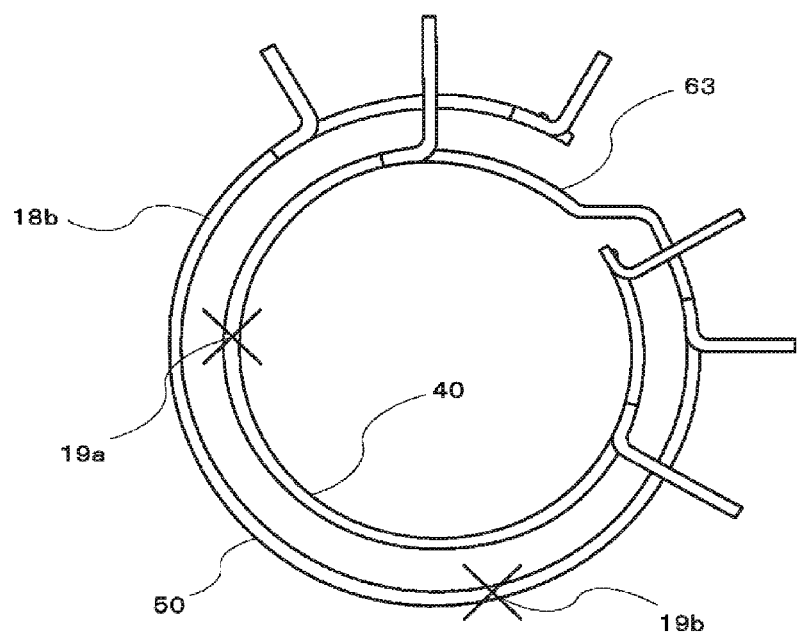

Embodiment 2 of the present invention will be described with reference to FIG. 8A and FIG. 8B. FIG. 8A is a front view and FIG. 8B is a plan view, each showing an annular conductive member in a rotary electric machine according to Embodiment 2 of the present invention.

As described above, three types of components need to be manufacture for the respective annular conductive member 40, 50, and 63. However, these three types of annular conductive members can be manufactured from a single member. FIG. 8A shows a conductive member 18a and there exist a total of twelve arm portions 11 of two types different in length. This sort of belt-shaped conductive member 18a is manufactured; subsequently, the conductive member 18a is shaped into a double annual shape (only a part of the arm portions 11 is shown) as shown in FIG. 8B; and then, the conductive member 18a is divided into three portions by cutting at "X" marks 19a, and 19b in the drawing. Accordingly, three types of annular conductive members 40, 50, and 63 are completed; and thus, the annular conductive members are inserted in turn respectively into insulating annular groove portion 6.

In this manner, desired annular conductive members are made by manufacturing one belt-shaped conductive member 18a to be formed in the double shape and to be cut at two points; and therefore, working equipment can be reduced and working time can be shortened as compared to the case where different three types of conductive members are manufactured.

Embodiment 3

Figure 9:
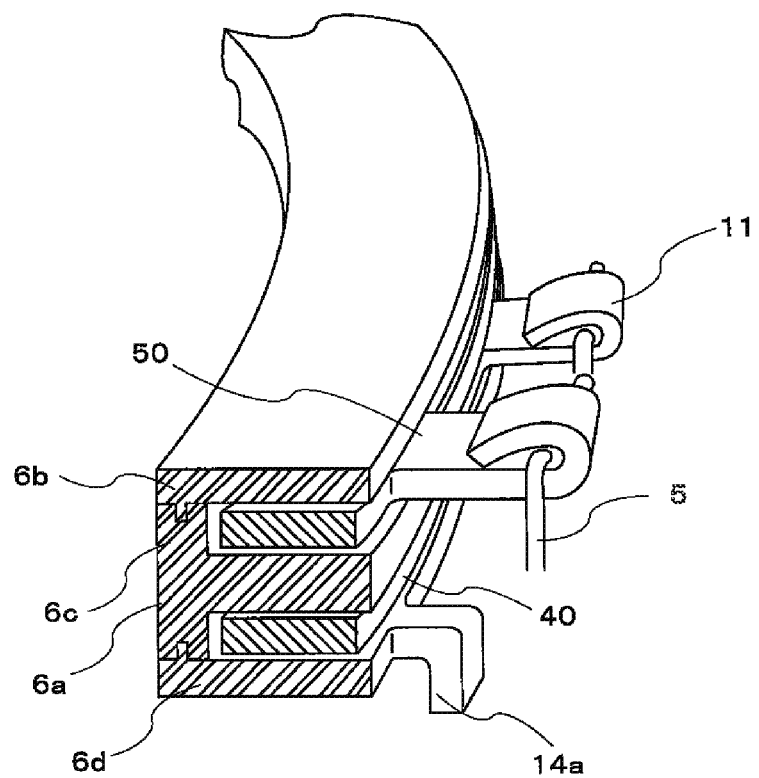
FIG. 9 is a relevant part perspective view showing an insulating annular groove portion in a rotary electric machine according to Embodiment 3 of the present invention.

Embodiment 3 of the present invention will be described with reference to FIG. 9. FIG. 9 is a relevant part perspective view showing an insulating annular groove portion in a rotary electric machine according to Embodiment 3 of the present invention.

In the aforementioned Embodiment 1, the annular conductive member and the insulating annular groove portion are formed in the double shape in the radial direction; however, as shown in FIG. 9, an axial two-story structure can be made. In this case, this is not used to put the plate thickness direction of a belt shaped conductive member vertically as described above, but the surface (belt) is used to put the belt shaped conductive member in the same direction as the laminating direction of a stator core 12. An insulating annular groove portion 6a can also be similarly achieved by forming from the aforementioned verticallyfacing E shape to a laterally-facing E shape in cross section, thereby forming the axial two-storied structure; however, axial dimension can be achieved substantially equivalent to the aforementioned Embodiment 1 and Embodiment 2 and coil connection which is compact and good workability can be similarly achieved.

Incidentally, in the case where one opened section of respective annular conductive members 40, 50, and 63 is narrower than a half of circular arc, the annular conductive members cannot be inserted into the integrated two-story annular groove portion shown FIG. 9. In this case, if the annular shaped groove portion of FIG. 9 is divided into three portions of 6b, 6c, and 6d, the annular conductive members can be inserted into the grooves. In this case, if the portions of 6b and 6c and the portions of 6c and 6d are formed in a concave and convex structure as shown in FIG. 9, assembly can be easily performed.

The description has been made on the example of the motor, but this description is not limited to the motor; and this description can also be used for a generator if the generator is a delta connection configuration having a plurality of coil windings. As described above, in the rotary electric machine, the connection structure of the coil winding has the double annular conductive member and the double annular groove portion; and consequently, effects can be exhibited in that a space is saved and workability is improved.

INDUSTRIAL APPLICABILITY

The present invention is suitable for actualizing a rotary electric machine and a method of manufacturing the same, in which coil terminal processing can be easily achieved, workability is improved, and space saving can be secured.

The invention claimed is:

1. A rotary electric machine comprising a stator having a stator core to which a plurality of coil windings are attached by winding and a connection member forming a three phase delta connection by said coil windings,
   wherein said connection member is arranged on the coil end portion side of said coil windings of said stator, and is composed of an insulating annular groove portion formed with double annular grooves, a first annular conductive member, a second annular conductive member, and a third annular conductive member, said first annular conductive member, said second annular conductive member, and said third annular conductive members being attached by insertion into the insulating annular groove portion;
   the insulating annular groove portion is formed with double grooves of one and the other, and both the grooves are connected via one window portion;
   said first annular conductive member, said second annular conductive member, and said third annular conductive members are each formed in a circular arc shape and provided with a plurality of arm portions extended outward in the radial direction of said stator, the plurality of arm portions being connected to the coil end portions of said coil windings respectively;
   said first annular conductive member and said second annular conductive member are attached by insertion into different grooves of the insulating annular groove portion, are overlapped at a part of opened sections where a circular arc is not present, are in a positional relationship in which both said annular conductive members are opened, and are attached by insertion so that the window portion is disposed at the position where both said annular conductive members are opened; and
   said third annular conductive member is made such that a portion to be attached by insertion into one groove and a portion to be attached by insertion into the other groove are attached by insertion into the insulating annular groove portion via the window portion.

2. The rotary electric machine according to claim 1,
   wherein said first annular conductive member, said second annular conductive member, and said third annular conductive members each has the same number of arm portions;
   said third annular conductive member has a crossover portion crossing from one groove to the other groove, and said third annular conductive member on one groove and said third annular conductive member on the other groove are integrally configured via the crossover portion;
   the window portion in the insulating annular groove portion is arranged at a section where said first annular conductive member and said second annular conductive member are opened, and between the coil end portions of said coil windings.

3. The rotary electric machine according to claim 2,
   wherein said first annular conductive member, said second annular conductive member, and said third annular conductive members are each formed in a plate shape which faces in the radial direction of said stator in the plate thickness direction, and are formed in a double annular shape in the radial direction.

4. The rotary electric machine according to claim 2,
   wherein said first annular conductive member, said second annular conductive member, and said third annular conductive members are each formed in a plate shape which faces in the axial direction of said stator in the plate thickness direction, and are formed in a double annular shape in the axial direction.

5. A method of manufacturing a rotary electric machine comprising a stator having a stator core to which a plurality of coil windings are attached by winding and a connection member forming a three phase delta connection by said coil windings,
   wherein said method comprising a step of manufacturing said connection member,
   the manufacturing step of said connection member including: a step of manufacturing an insulating annular groove portion in which double grooves of one and the other are formed and both the grooves are connected via one window portion; a step of manufacturing a first annular conductive member, a second annular conductive member, and a third annular conductive member; and an assembling step of assembling said respective annular conductive members on the insulating annular groove portion,
   the manufacturing step of said first annular conductive member, said second annular conductive member, and said third annular conductive members including a step of manufacturing said first annular conductive member, said second annular conductive member, and said third annular conductive member having a crossover portion that connects one groove and the other groove at the center of the window portion, each of said first annular conductive member, said second annular conductive member, and said third annular conductive members being provided with a plurality of arm portions extended in the radial direction of said stator and being formed in a circular arc shape, and the assembly step including: a step of attaching said first annular conductive member by inserting into the one groove so that the window portion is located in an opened section where a circular arc is not present; a step of attaching by insertion into the groove so that the crossover portion of said third annular conductive member is located in the window portion; and a step of attaching said second annular conductive member by inserting into the other groove so that the window portion is located in an opened section where a circular arc is not present, and wherein said method comprising:

a step of fixing said connection member assembled with said first annular conductive member, said second annular conductive member, and said third annular conductive members to said stator; and a step of connecting the arm portions and coil end portions of said coil windings.

6. The method of manufacturing the rotary electric machine according to claim 5, wherein the manufacturing step of said first annular conductive member, said second annular conductive member, and said third annular conductive member includes a step of manufacturing said first annular conductive member, said third annular conductive member, and said third annular conductive member by manufacturing one plate shaped conductive member, subsequently by forming in a double annular shape, and then by cutting two points.

\* \* \* \* \*